United States Patent [19]

Schell

[11] 4,087,513
[45] May 2, 1978

[54] METHOD OF HYDROLYZING UREA CONTAINED IN WASTE WATER STREAMS

[75] Inventor: Lorenz P. Schell, Sulphur, La.

[73] Assignee: Olin Corporation, New Haven, Conn.

[21] Appl. No.: 823,883

[22] Filed: Aug. 12, 1977

[51] Int. Cl.² .................. C07C 126/08; C01C 1/08
[52] U.S. Cl. ........................... 423/437; 260/555 A; 423/232; 423/237; 423/358; 423/359; 210/71
[58] Field of Search .............. 423/232, 237, 238, 358, 423/359, 437; 210/65, 71; 260/555 A, 555 B, 555 C

[56] References Cited
U.S. PATENT DOCUMENTS 3,826,815  7/1977  Mavrovic .................. 260/555 A Primary Examiner—Earl C. Thomas
Assistant Examiner—Thomas W. Roy
Attorney, Agent, or Firm—William A. Simons; T. P. O'Day

[57] ABSTRACT

A process for hydrolyzing urea in waste water streams which comprises introducing a waste water stream containing urea into a carbon dioxide recovery system such as used in connection with the production of ammonia, and therein hydrolyzing substantially all of the urea in the waste water stream.

17 Claims, 1 Drawing Figure

U.S. Patent    May 2, 1978    4,087,513
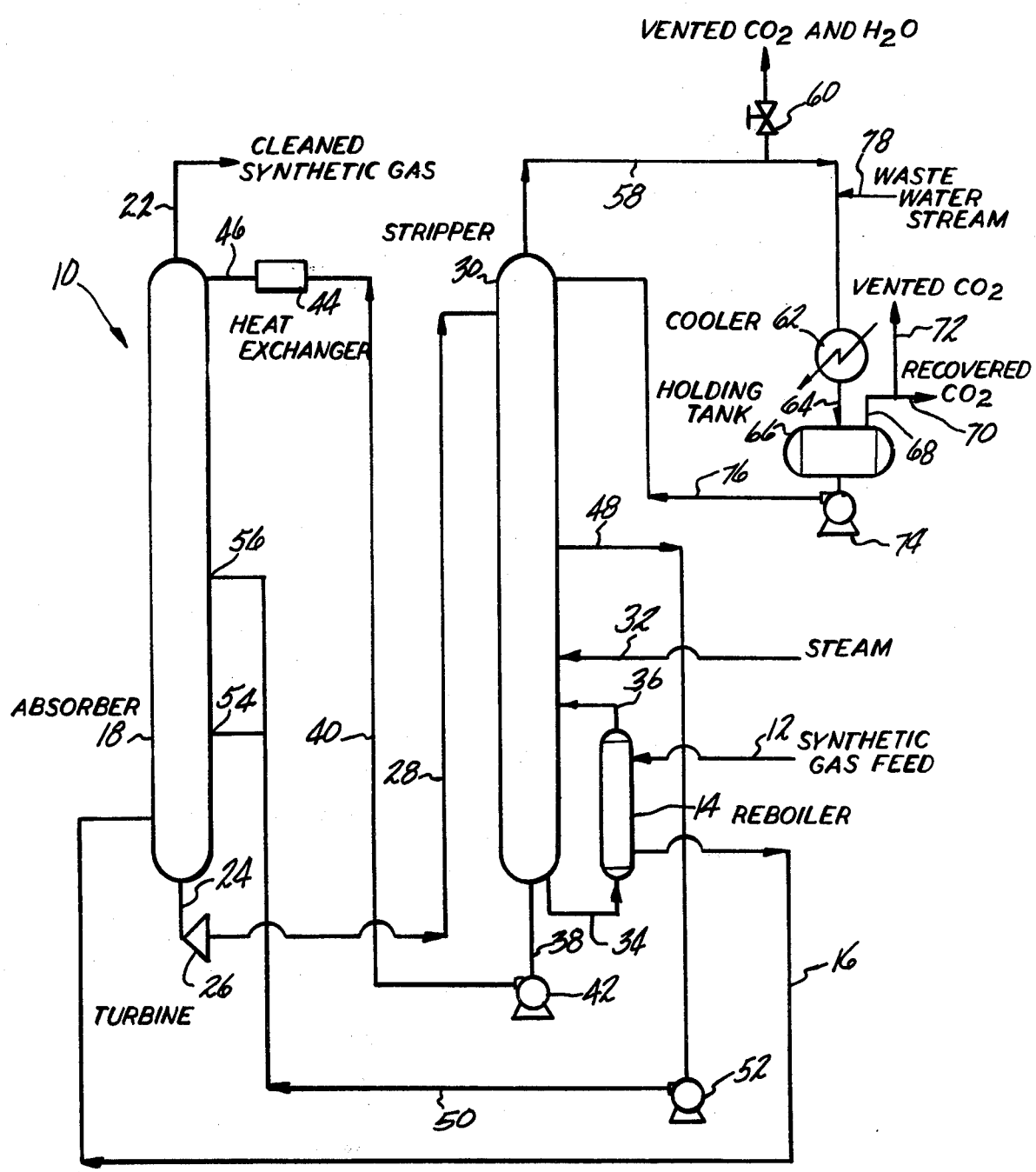

METHOD OF HYDROLYZING UREA CONTAINED IN WASTE WATER STREAMS

BACKGROUND OF THE INVENTION

1. Field of the Invention

This invention relates to a method of hydrolyzing urea contained in waste water streams. In particular, the present invention relates to a novel way of treating waste water streams formed during urea production. Furthermore, the present invention relates to an improvement in the joint production of urea and ammonia.

2. Description of the Prior Art

Urea is commonly made today by reacting two moles of ammonia with one mole of carbon dioxide under elevated pressures and temperatures. This reaction forms one mole of urea and one mole of water as a by-product. The urea produced by this reaction is then separated from the reaction mixture by conventional concentration or crystallization methods. A solid urea product is thus recovered. The by-product water formed by this reaction forms one or more waste water streams. Such streams may contain a minor amount of urea and urea-related compounds, usually from about 0.05% to about 10% by weight. These streams also contain other impurities, such as unreacted ammonia and carbon dioxide.

In the past, these waste water streams were disposed of by dumping into the sewer. However, lately, it has been recognized by both the urea industry and the responsible governmental agencies that dumping urea-containing effluent streams may create possible environmental hazards.

Therefore, several processes have been suggested for treating these waste water streams. Some processes treat such streams in order to simply remove the ammonia and/or carbon dioxide contained therein, and leave any urea contained therein untouched. See U.S. Pat. Nos. 3,436,317, issued to Otsuka et al. on Apr. 1, 1969; 3,620,031, issued to Tennyson on Nov. 16, 1971; and 3,725,210, issued to Otsuka et al on Apr. 3, 1973. It is surmised that such references did not explicitly treat the urea in the waste water streams because urea is non-volatile in water and, therefore, is not easy to remove. In fact, the most effective way of removing the urea from the water is to hydrolyze it back to ammonia and carbon dioxide at above-ambient temperatures (the reverse reaction of the above-described urea synthesis). Some hydrolysis treatments have been disclosed. See U.S. Pat. Nos. 3,826,815, issued to Mavrovic on July 30, 1974 and 3,922,222, issued to Van Moorsel on Nov. 25, 1975. However, these methods of treating waste water containing urea have disadvantages. First, additional equipment must be constructed for these hydrolysis treatments. Also, this equipment must ordinarily be constructed of stainless steel since urea solutions may cause corrosion to ordinary carbon steel equipment. Therefore, the addition of such expensive equipment to the urea process would raise the cost of production. Furthermore, hydrolysis processes such as those illustrated in the cited patents require substantial energy costs because steam is normally required to heat the hydrolysis reaction.

At the present time, urea production plants are usually built near ammonia production plants because the two raw materials for urea production, namely, $NH_3$ and $CO_2$, can be readily obtained from the ammonia plants. The usual method for producing ammonia today is by the so-called synthetic gas route. According to this method, a synthetic gas mixture comprising hydrogen, nitrogen and carbon dioxide is formed. This may normally be done by any conventionally known processes for reforming natural gas and the like. After this synthetic gas mixture is formed, it is passed through a carbon dioxide recovery system whereby a major portion of the carbon dioxide in the gas mixture is separated out and recovered. The synthetic gas, now greatly depleted of $CO_2$, is preferably then passed through a methanization step where any residual $CO_2$ and carbon monoxide is changed into methane. Next, the $N_2$ and $H_2$ remaining in the gas mixture are converted into ammonia, usually in the presence of a catalyst. The $CO_2$ and CO are normally removed from the synthetic gas mixture because they interfere with most conventional conversion catalysts, thereby lowering the yield of ammonia.

The carbon dioxide recovery system operation for such ammonia production processes normally comprises the steps of first passing the $CO_2$-containing synthetic gas through one or more absorption towers containing an aqueous solution. This aqueous solution is capable of absorbing a major portion of the $CO_2$ from the synthetic gas without absorbing a significant amount of $N_2$ or $H_2$ and may contain one or more chemical additives (e.g., potassium carbonate) to enhance the $CO_2$ absorption. After the $CO_2$ has been absorbed into this aqueous solution, the solution is transferred to one or more stripping towers where the $CO_2$ is stripped from the aqueous solution and then recovered. Preferably, after this stripping operation, the aqueous solution is recycled back to the absorption tower in order to absorb more $CO_2$. The attached Drawing, discussed in detail below, illustrates one such $CO_2$ recovery system. Further illustrations of carbon dioxide recovery systems are described in U.S. Pat. Nos. 3,851,041 and 3,896,212, both issued to Eickmeyer on Nov. 26, 1974 and July 22, 1975, respectively, and in U.S. Pat. Nos. 3,642,430; 3,685,960; and 3,823,222, all of which issued to Benson on Feb. 15, 1972, Aug. 22, 1972 and July 9, 1974, respectively. All five of these patents are incorporated by reference in their entirety.

Because urea and ammonia production facilities usually exist in close proximity to each other, it would be an advantageous solution to the above-mentioned waste water problem from the urea plant if the $CO_2$ recovery system of the ammonia production process could be utilized without major modification to hydrolyze the urea contained in waste water streams formed in the urea production. In particular, the employment of a $CO_2$ recovery system for this use could have several commercial advantages over existing hydrolysis treatments. One, since the $CO_2$ recovery system already exists, no new costly equipment would have to be constructed. Further, since the $CO_2$ recovery system normally operates at higher than ambient temperatures, hydrolysis of the urea can occur without the necessity of additional energy inputs (e.g., steam).

SUMMARY OF THE INVENTION

Accordingly, the present invention is directed to a process which comprises introducing a waste water stream containing urea into a carbon dioxide recovery system and therein hydrolyzing substantially all of the urea in the waste water stream. The operation of the carbon dioxide recovery system comprises the steps of absorbing carbon dioxide into an aqueous solution from a gas stream and then separating the carbon dioxide from the aqueous solution. The present invention is especially useful as an improvement in the combined production of ammonia and urea comprising the steps of:
- (a) forming a gas mixture comprised of nitrogen, hydrogen and carbon dioxide,
- (b) removing and recovering a major portion of the carbon dioxide from the mixture in a carbon dioxide recovery system wherein
  - (i) a major portion of the carbon dioxide is absorbed into an aqueous solution, and
  - (ii) substantially all of the absorbed carbon dioxide is then separated from the aqueous solution such as by stripping,
- (c) utilizing the remaining gas mixture to form ammonia by the reaction of nitrogen with hydrogen,
- (d) reacting at least a portion of the ammonia with carbon dioxide to form a reaction mixture comprised of urea and water, and
- (e) recovering a major portion of the urea, usually as a solid, leaving a waste water stream containing a minor proportion of urea, wherein the improvement comprises introducing the waste water stream into the carbon dioxide recovery system and therein hydrolyzing substantially all of the urea in the waste water stream.

BRIEF DESCRIPTION OF THE DRAWING

The Drawing depicts a flow diagram of a preferred embodiment for carrying out the present invention wherein a urea-containing waste water stream from a urea production process is introduced into a $CO_2$ recovery system of an ammonia production process.

DETAILED DESCRIPTION

Any waste water stream containing a minor percentage of urea (i.e., less than about 50% by weight of the total stream) can be treated by the present invention. Moreover, the waste water stream can contain other impurities besides urea. For example, a urea-containing stream from a urea production plant would most likely also have small amounts of ammonia and carbon dioxide contained therein. Furthermore, the term "urea" as employed in the present specification and claims includes urea-like chemical compounds such as biuret and the like which, when hydrolyzed, form carbon dioxide and ammonia. Preferably, the percentage of urea in the waste water stream is from about 0.01% to about 20% by weight of the stream. More preferably, the process of the present invention is advantageously used to treat waste water streams containing from about 0.05% to about 10% by weight of urea.

The waste water stream to be treated according to the present process may be from any particular source. Of course, waste water streams from any conventional urea production processes are the most preferred. Yet, other sources including water streams from urea storage and loading facilities (i.e., to collect spillage and leaks) may be also advantageously treated according to the process of the present invention.

For illustration, the following briefly describes a urea production process that produces a waste water stream which may be advantageously treated according to the process of the present invention. First, ammonia and carbon dioxide are reacted together, for example at about 175°–200° C and about 2500–3000 psig, to form ammonium carbamate

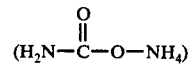

which by an equilibrium reaction forms urea and water. These reactions are represented by the following equations:

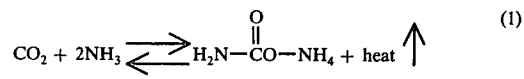

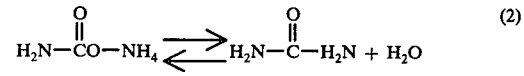

Following substantial completion of these reactions, the gaseous reaction mixture is passed through a three-stage gas separator to remove large amounts of unreacted ammonia and carbon dioxide gases and lower the pressure of the reaction mixture to about atmospheric pressure. Then, the reaction mixture is passed through a flash tank which is under vacuum. This step effects the removal of large quantities of water vapor. After passing through the flash tank, the resulting reaction mixture, which now usually contains about 70–75% by weight urea and about 30–25% water, is sent through a two-stage evaporator wherein the remaining water is evaporated off and substantially anhydrous urea product (i.e., above 99% by weight urea) is formed. The substantially anhydrous urea product is then prilled into a solid urea product suitable for sale or use in other chemical processes. The vaporized water from the flash tank and from the evaporator is combined and then condensed to form a waste water stream. This waste water stream is preferably passed through an ammonia desorber which removes a large portion of the ammonia without affecting the small amount of urea contained therein. This waste water stream is then treated according to the process of the present invention. However, it should be recognized that the present invention is not limited to any particular process by which the waste water stream is formed.

As stated above, the process of the present invention encompasses the concept of introducing a waste water stream containing a minor percentage of urea into a carbon dioxide recovery system, whereby the urea in the waste water stream is hydrolyzed to ammonia and carbon dioxide. This hydrolysis reaction can be represented by the following equation:

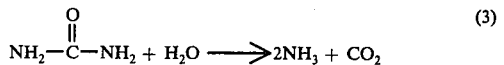

It can be seen that this reaction is essentially the reverse of the urea synthesis reactions represented by equations (1) and (2) shown above.

Carbon dioxide recovery systems which are used herein can be of any suitable type wherein carbon dioxide is absorbed into an aqueous solution from a gas stream and then separated, such as by stripping from the aqueous solution. Sufficient water to effect hydrolysis of substantially all of the urea should be present in the carbon dioxide recovery system. According to equation (3), this would be at least a molar equivalent of the urea present in the waste water stream. In practice, a large molar excess of water is preferably employed to ensure that the hydrolysis is completed. Furthermore, it should be noted that the $CO_2$ and $NH_3$ formed by this hydrolysis reaction are compatible with the $CO_2$ recovery system.

Beside the presence of water, hydrolysis of substantially all of the urea in the carbon dioxide recovery system requires the correct combination of reaction temperature and residence time. Since hydrolysis occurs very slowly at ambient temperatures, the residence time at such temperatures would be relatively long; whereas, at elevated temperatures, the hydrolysis reaction occurs much faster and, thus, a shorter residence time will be needed. Therefore, it is preferred to operate the absorption and stripping steps of the recovery system at elevated temperatures, preferably in the range of from about 90° C to about 130° C in order to obtain hydrolysis of substantially all of the urea in a relatively short time. Since most conventional carbon dioxide recovery systems in ammonia production processes operate in this temperature range, the employment of these temperatures therein would not require any major modification to existing $CO_2$ recovery systems in ammonia production processes.

The urea-containing waste water stream can be introduced into any carbon dioxide recovery system which utilizes the above-mentioned absorption and stripping steps. The point of introduction is not critical because the urea is essentially non-volatile and will remain in the aqueous solution until hydrolyzed. In particular, the waste water stream can be added to the apparatus which carries out either the absorption or the stripping step. Normally, these will be conventional absorption and stripping towers. Alternatively, the waste water stream can be added to a fluid line or pipe that transfers the aqueous solution from the absorption step to the stripping step. It can also be added to a recycle line or a pipe which transfers the aqueous solution depleted of $CO_2$ from the stripping step back to the absorption step. Moreover, the carbon dioxide recovery system can be any system which removes and recovers $CO_2$ from any gas mixture or stream and is not limited to just those used in ammonia production processes.

The carbon dioxide recovery system as described above normally removes water vapor with the $CO_2$ gas during the stripping step. Preferably, this mixture of water vapor and $CO_2$ gas is cooled by conventional means to condense a major portion (i.e., more than about 50% by weight) of the water vapor and thereby form a condensed water phase with the $CO_2$ gas phase. After cooling, the two phases are then separated. The condensed water phase is then preferably recycled back to the stripping step to resupply the $CO_2$ recovery system with water which was removed by the stripping step. The removed $CO_2$ gas is then recovered for use in other chemical processes or for commercial sale. Excess $CO_2$ not needed for such uses can be easily vented to the atmosphere. Moreover, if $CO_2$ is being removed from the stripping step in quantities that are in excess of what is needed for further commercial use, then at least a portion of this excess quantity can be vented off with water vapor prior to the condensation step. Such venting lowers the energy load needed for the cooling step.

In a preferred embodiment of the process of the present invention as described hereinbelow with reference to the Drawing, it is desirable to add the urea-containing waste water stream after the stripping step, and more preferably, after the venting of hot $CO_2$ and $H_2O$ gases, but before the cooling step as described above. By doing this, the introduction of the waste water stream into the carbon dioxide recovery system and hydrolysis of substantially all of the urea contained in the waste still occurs. But, in addition, this waste water stream will cool a portion of the water vapor present in the gas mixture and may result in a lowering of the energy load in the cooling step. Furthermore, the addition of this waste water stream will supply more water which can be recycled back to the stripping step. Therefore, it will eliminate the need to condense an equivalent amount of water vapor present in the gas mixture. And, by eliminating the need for this amount of water vapor condensation, more water vapor can be vented off before condensing and the energy load for the cooling or condensation step will be further lowered. Such a saving of cooling energy can be quite significant.

Referring now more specifically to the Drawing, a preferred embodiment of the present invention is shown wherein a urea-containing waste water is treated by a conventional carbon dioxide recovery system of an ammonia production process. In particular, a synthetic gas mixture is first formed by reforming natural gas according to conventionally known methods. The synthetic gas normally contains one mole of nitrogen to about three moles of hydrogen. However, impurities such as carbon dioxide, methane, carbon monoxide and the like may also be present. Since carbon dioxide and carbon monoxide can interfere with the reaction catalysts which converts nitrogen and hydrogen to ammonia, these impurities must be substantially removed before the conversion step.

As shown in the Drawing, a synthetic gas feed which comprises nitrogen, hydrogen and carbon dioxide is fed into a $CO_2$ recovery system, represented broadly as 10, via line 12 from a reforming step (not shown) and a shift conversion step (also not shown). First, this feed gas passes through a shell and tube reboiler 14 where the temperature of the feed gas is reduced from about 180°–190° C to about 135°–145° C. This reboiler also supplies a portion of the heat necessary for the stripping step in stripping tower 30. After passing through the reboiler 14, the cooled feed gas is transferred via line 16 to the bottom of absorption tower 18. In this absorption tower 18, substantially all of the carbon dioxide contained in the feed gas is selectively absorbed into an aqueous solution as the feed gas bubbles up through the absorber. The absorption tower may be of any conventional construction and may contain packing, sieve trays and the like. After passing through absorption tower 18, the cleaned synthetic gas stream, now substantially depleted of carbon dioxide, is transferred via line 22 to a conventional methanization reactor (not shown) and then to a conventional ammonia conversion reactor (not shown) wherein ammonia is synthesized. Neither the methanization reactor nor the conversion reactor are critical parts of the present process and any conventionally employed equipment and procedures for these two steps may be used.

The aqueous solution can be any conventional aqueous solution which is commonly used in absorbing $CO_2$ from gas streams such as synthetic feed gas employed in ammonia production. The aqueous solution normally added to the carbon dioxide recovery system in amounts to substantially fill up both absorption tower 18 and stripping tower 30 and the connecting lines between said towers. Illustrative examples of commonly employed aqueous solutions include the "Catacarb" solution which is a proprietary solution of A. G. Eickmeyer or the "Benfield" solution which is a proprietary solution of the Benfield Corporation. Both of these solutions contain potassium carbonate and other chemicals to enhance absorption of $CO_2$ into the aqueous solution. Discussion of these types of aqueous solutions may be found in the five patents issued to either Eickmeyer or Benson and cited above. However, it should be understood that the process of the present invention is not to be limited to these aqueous solutions which absorb $CO_2$ from a gas stream and any conventionally used aqueous solution may be employed.

Since the synthetic gas stream is fed into absorption tower 18 under pressure of about 400 psig, it is necessary to operate the absorption operation in approximately this high pressure range. Therefore, when the aqueous solution, rich with $CO_2$, leaves the bottom of absorption tower 18 via line 24, the pressure on the aqueous solution must be lowered for the stripping operation. This is accomplished by the employment of turbine motor or pump 26 which releases the pressure on the aqueous solution while pumping it via line 28 to the top of the stripping tower 30. In stripping tower 30, the aqueous solution is depleted of $CO_2$ as it passes down the tower. Steam is added to the middle of the stripping tower via line 32 in order to help provide heat for the stripping operation. Furthermore, the aqueous solution is further reheated through reboiler 14 via entering line 34 and exit line 36 to also aid the stripping operation. Stripping tower 30 can be of any conventional construction and may be packed or contain bubble or sieve trays and the like. In operation, the stripping tower has a pressure in the range of about 10 psig and, like the absorption tower, has a temperature range of about 90°–110° C at the top to about 120°–130° C at the bottom.

After passing down through the stripping tower 30, the aqueous solution, now depleted of $CO_2$, is transferred by lines 38 and 40 through pump 42 back to the top of absorption tower 18. However, before entering the top of the absorption tower, it is passed through an air-cooled heat exchanger 44 to lower its temperature from about 120°–130° C down to 90°–110° C. After passing through this heat exchanger, it enters the top of the absorption tower via line 46. And, in order to increase the efficiency of both absorption tower 18 and stripping tower 30, it is preferred to remove a portion of the aqueous solution which is semi-lean or partly depleted in $CO_2$ content in the middle of the stripping tower. This semi-lean aqueous solution is transferred via lines 48 and 50 by means of pump 52 to the middle of absorption tower 18 where it enters at points 54 and 56.

The $CO_2$ and water vapor are stripped from the top of stripping tower 30 and are removed by vapor line 58. When the amount of carbon dioxide being stripped is in excess to what is needed for commercial applications, it may be desirable to vent to the atmosphere at least a portion of this excess $CO_2$ along with some water vapor via hot vent 60. The hot mixture of $CO_2$ and $H_2O$ vapor passing through line 58 may, for example, have a temperature in the range of about 90°–110° C. Therefore, in order to separate the $CO_2$ from the water vapor, the hot gaseous mixture in line 58 is passed through a cooler 62 such as a shell and tube condenser or other equivalent cooling means. The temperature of the resulting gas and liquid mixture is thereby reduced, for example, to about 35°–45° C, and a major portion of the water vapor present condenses into the liquid phase.

Next, the cooled gas and liquid mixture passes through line 64 into holding tank 66 where the liquid phase is separated from the gaseous phase composed mainly of $CO_2$. This gaseous phase which occupies the top of holding tank 66 is drawn off via line 68 where it is utilized via line 70 for urea production or some other chemical processes. Excess $CO_2$ not needed for commercial use is vented to the atmosphere via line 72, when necessary. From holding tank 66, the liquid phase is transferred by pump 74 and line 76 back to the top of stripping tower 30. This reflux or recycled liquid in line 76 replaces the water vapor which was stripped off the stripping tower along with carbon dioxide. Furthermore, this recycled liquid aids in controlling the temperature of the stripping operation.

According to a preferred embodiment of the present invention, a waste water stream containing urea from some source (not shown), such as a urea production process, is fed via line 78 into the hot vapor stream of line 58. The addition of the waste water stream immediately causes some of the water vapor to condense. The resulting mixture of waste water and hot vapors then passes through cooler 62. Substantially all of the urea that was originally contained in the waste water stream is entrapped in the aqueous liquid phase in holding tank 66. This urea is then fed into the stripping tower 30 contained in the reflux stream. The urea is then circulated throughout the carbon dioxide recovery system as part of the aqueous solution until it is hydrolyzed to form $CO_2$ and $NH_3$. The $CO_2$ formed by the hydrolysis of urea normally exits with the rest of the urea at the top of stripping tower 30 and may, therefore, be recovered and commercially utilized. The $NH_3$ formed from this hydrolysis reaction is either stripped off with the $CO_2$ at the top of the stripping tower 30 or is removed with the cleaned synthetic gas at the top of absorption tower 18.

The introduction of this waste water stream can also act as an advantage to the operation of the $CO_2$ recovery system. Specifically, when this waste water stream is fed in through line 78, then hot vent 60 can be opened wider to vent off more excess carbon dioxide and water vapor. The escaped water vapor is then replaced by the water in the waste water stream from line 78. This latter source of water does not have to be condensed. Therefore, the amount of energy needed to effect the operation of cooler 62 can be substantially reduced and significant energy savings to the overall ammonia production process can result.

The following example and comparison further illustrate the process of the present invention. All portions and percentages are by weight unless explicitly stated otherwise.

EXAMPLE 1

This example describes a preferred embodiment of the present invention which is illustrated generally by the Drawing. A waste water stream from a urea production plant was added to carbon dioxide recovery system 10 in an ammonia production process for nine days via line 78 to the hot vapor line 58. The temperature of the waste water stream was about 88° C and approximately 23,100 pounds per hour of water passed through line 78. The stream contained an average of 123 pounds per hour urea, three pounds per hour carbon dioxide and 62 pounds per hour ammonia. The hot $CO_2$ and water vapor mixture had an average temperature of about 102° C when mixed with the waste water stream. The resulting mixture of the hot vapor stream and the waste water stream was then passed through a shell and tube condenser 62 wherein the temperature of this mixture was lowered to about 44° C. The cooled liquid and vapor mixture was then transferred to holding tank 66 where the liquid phase separated from the gaseous phase. The gaseous phase was drawn off by a line off the top of the holding tank. Of this recovered gaseous phase, about 440 tons per day (or about 36,700 pounds per hour) was used for the urea production plant or sold for other chemical applications. This commercially used $CO_2$ contained about 700 pounds per hour water and about one pound per hour nitrogen. Excess $CO_2$ which was not needed for commercial use was vented to the atmosphere. It was estimated that approximately 77,000 pounds per hour $CO_2$ was vented. With this vented $CO_2$, it was also estimated that approximately 1,500 pounds per hour of water vapor escaped.

The liquid phase in holding tank 66 was pumped back to the top of two stripping towers 30 at the rate of about 250 gallons per minute. The temperature of this resulting liquid stream was around 40° C. The urea from the waste water stream was substantially entrapped in this liquid stream and had not substantially hydrolyzed before entering the stripping towers.

The carbon dioxide recovery system utilized herein had a 100,000 gallon liquid capacity and had one absorption tower and two stripping towers and all three towers were approximately 200 feet tall. This recovery system was filled with a "Catacarb" aqueous absorption solution which is a proprietary mixture of A. G. Eickmeyer. It is known that this "Catacarb" solution contained potassium carbonate. However, the exact percentage and identity of each chemical constituent was not known.

This carbon dioxide recovery system was part of ammonia production process wherein a synthetic gas stream was introduced into the system via line 12. This synthetic gas stream was introduced at a rate of approximately 121,700 standard cubic feet per minute under 400 psig and at about 187° C. The average composition of this synthetic gas stream is given in Table I.

TABLE I

| Gas | Volume or Molar % |
|---|---|
| $H_2$ | 60.90% |
| $N_2$ | 20.06% |
| $CO_2$ | 18.31% |
| $CH_4$ | 0.39% |
| CO | 0.11% |
| Argon | 0.23% |
| | 100.00% |

The synthetic gas stream was passed through shell and tube reboiler 14 where its temperature was lowered to about 140° C. Afterwards, it was transferred to absorption tower 18 which contained 69 sieve trays. The synthetic gas was allowed to bubble through the "Catacarb" solution and substantially all of the $CO_2$ contained therein was absorbed into this aqueous solution. The absorption tower 18 was held under approximately 400 psig. The cleaned synthetic gas left the top of the absorption tower at an average rate of approximately 100,000 standard cubic feet per minute and normally contained less than 1,500 parts by weight per million of $CO_2$.

In absorption tower 18, the aqueous "Catacarb" solution traveled countercurrent to this rising gas stream. This "Catacarb" solution, rich in $CO_2$ content, passed through the bottom of the absorption tower, was divided and then transferred to the top of each of the two stripping towers 30. However, this aqueous solution was first passed through turbine pump 26 to lower the solution's pressure from about 400 psig to approximately 10-20 psig. The rate of solution transferred from the absorption tower to the stripping tower was approximately 7,000 gallons per minute.

The $CO_2$-rich aqueous solution was introduced into the top of each of the two stripping towers 30. Both stripping towers contained 46 bubble-cup trays and the $CO_2$-rich solution was introduced under the number 45 tray as counted from the bottom of the towers. This solution was allowed to travel downward through both of the towers and thereby be stripped of $CO_2$ and water vapor. The temperature at the top of the towers was approximately 102° C, while at the bottom of these stripping towers, the temperature was approximately 130° C. In order to strip off the $CO_2$, steam was added to the middle of each stripping tower at the rate of about 28,000 pounds per hour. The temperature of the steam was approximately 123° C. The aqueous solution was also heated by passing it through the shell and tube reboiler 14 in order to further aid in the stripping operation.

The "Catacarb" solution, now greatly depleted of $CO_2$ content, left the bottom of each stripping tower and is pumped at a rate of approximately 850 gallons per minute back to the top of the absorption tower. But, before entering the top of the absorption tower, it was passed through an air-cooled heat exchanger 44, to lower its temperature from about 130° C to about 100° C. Also, to optimize the efficiency of the absorption tower and two stripping towers, a semi-lean or partly $CO_2$-depleted stream was drawn off each of the stripping towers above each of the number 18 bubble-cup tray. This semi-lean stream was pumped back to the middle of the absorption tower at a rate of about 6,000 gallons per minute where it was introduced above the number 8 and 26 sieve trays, as numbered from the bottom of the absorption tower.

It was estimated that approximately 147,000 pounds per hour of $CO_2$ was stripped off the top of the two stripping towers. Along with this $CO_2$, it was estimated that about 135,000 pounds per hour water vapor and 750 pounds per hour $NH_3$ were stripped off. Hot vent 60 was opened relatively wide and it was estimated approximately 33,000 pounds per hour $CO_2$, about 30,000 pounds per hour $H_2O$ and about 170 pounds per hour $NH_3$ were vented off.

Analysis of the samples of the aqueous solution taken from various lines connecting the absorption and two stripping towers during and after this nine-day run indicated that there was substantially no build-up of urea in the carbon dioxide recovery system and, thus, this was evidence that hydrolysis of substantially all of the urea introduced with the waste water stream had taken place. Moreover, no corrosion on the carbon steel absorption and stripping towers and connecting lines was noticed and it was believed that because the urea was so diluted in the aqueous solution of the $CO_2$ recovery system, hydrolysis could occur without the corrosion that was troublesome in prior art methods.

COMPARISON

Another run was taken employing substantially the same parameters as given in the preceding example except that urea-containing waste water stream was not introduced into the carbon dioxide recovery system. And, because this added water source was not introduced, the hot vent 60 was more closed and only about 9,000 pounds per hour $CO_2$ with about 8,300 pounds per hour water vapor and 50 pounds per hour $NH_3$ were vented before the cooler 62. Since 440 tons per day were still needed for commercial use, an increased amount of excess $CO_2$ not needed was vented off via line 72 after the cooling operation. This excess $CO_2$ that was vented was estimated to be about 102,000 pounds per hour. Along with this $CO_2$, it was estimated that about 2,000 pounds per hour of water vapor was also vented.

Comparison of these two runs shows that about 21,700 more pounds per hour of water vapor had to be condensed in cooler 62 when the waste water stream was not introduced prior to the cooling step and the amount of vented gases through hot vent 60 was reduced. This passage of more water vapor into cooler 62 means that more energy must be employed for the cooling step and, as a result, the cost of the carbon dioxide recovery system and the ammonia process overall is raised. In particular, it has been estimated that the process of the present invention as shown by the preceding example would reduce the energy load of the cooling step by about $21 \times 10^6$ British Thermal Units (BTU) per hour over the process described by this comparison.

What is claimed is:

1. In a process which comprises hydrolyzing urea which is contained in a waste water stream, the improvement which comprises effecting said hydrolysis in a carbon dioxide recovery system wherein
   (a) carbon dioxide is absorbed into an aqueous solution from a gas mixture,
   (b) said absorbed carbon dioxide and water vapor are stripped from said aqueous solution,
   (c) said stripped mixture of carbon dioxide and water vapor is cooled in order to condense a major portion of said water vapor into liquid water,
   (d) said liquid water is separated from said carbon dioxide, and
   (e) said liquid water is recycled back to said stripping step (b).

2. The process of claim 1 wherein the operation of said carbon dioxide recovery system further includes venting to the atmosphere of a portion of said stripped carbon dioxide and water vapor before said cooling step and said waste water stream is added into the carbon dioxide recovery system after said venting step and before said cooling step.

3. The process of claim 2 wherein said waste water stream contains from about 0.01% to about 20% by weight urea.

4. The process of claim 3 wherein said carbon dioxide recovery system is operated at a temperature from about 90° C to about 130° C.

5. The process of claim 4 wherein said aqueous solution in said carbon dioxide recovery system contains potassium carbonate.

6. The process of claim 5 wherein said waste water stream contains from about 0.05% to about 10% by weight urea.

7. The process of claim 6 wherein said waste water stream is from a urea production process.

8. The process of claim 7 wherein said carbon dioxide recovery system is part of an ammonia production process.

9. In a combined process for producing ammonia and urea comprising the steps of
   (a) forming a gas mixture comprised of nitrogen, hydrogen and carbon dioxide,
   (b) removing and recovering a major portion of the carbon dioxide from said gas mixture in a carbon dioxide recovery system wherein
      (i) a major portion of said carbon dioxide is absorbed into an aqueous solution, and
      (ii) substantially all of said absorbed carbon dioxide is then stripped from said aqueous solution,
   (c) utilizing the remaining gas mixture to form ammonia by the reaction of nitrogen with hydrogen,
   (d) reacting at least a portion of said ammonia with carbon dioxide to form a reaction mixture comprised of urea and water, and
   (e) recovering a major portion of said urea, leaving a waste water stream containing a minor proportion of urea,
   wherein the improvement comprises introducing said waste water stream into said carbon dioxide recovery system and therein hydrolyzing substantially all of said urea in the waste water stream.

10. The process of claim 9 wherein said waste water stream contains from about 0.01% to about 20% by weight urea.

11. The process of claim 9 wherein said carbon dioxide recovery system is operated at a temperature from about 90° C to about 130° C.

12. The process of claim 9 wherein water vapor is stripped from said aqueous solution with said carbon dioxide and in the operation of said carbon dioxide recovery system
   (iii) the stripped mixture of carbon dioxide and water vapor is cooled in order to condense a major portion of said water vapor into a liquid water phase,
   (iv) said liquid water phase is separated from said carbon dioxide, and
   (v) said liquid water phase is then recycled back to the stripping operation of (ii).

13. The process of claim 12 wherein in the operation of said carbon dioxide recovery system
   (vi) a portion of said stripped carbon dioxide and water vapor is vented before the cooling operation of (iii) and said waste water stream is added into said carbon dioxide recovery system after said venting operation (vi) and before said cooling operation (iii).

14. The process of claim 13 wherein said waste water stream contains from about 0.01% to about 20% by weight urea.

15. The process of claim 14 wherein said waste water stream contains from about 0.05% to about 10% by weight urea.

16. The process of claim 15 wherein said carbon dioxide recovery system is operated at a temperature from about 90° C to about 130° C.

17. The process of claim 16 wherein said aqueous solution in said carbon dioxide recovery system contains potassium carbonate.

* * * * *